Sept. 24, 1940.   W. H. MARSH   2,216,016
FLUID METER
Filed Aug. 5, 1937   2 Sheets-Sheet 1

INVENTOR
Walter H. Marsh.
BY
Lewis D. Kinigsford
ATTORNEY

Sept. 24, 1940.   W. H. MARSH   2,216,016
FLUID METER
Filed Aug. 5, 1937   2 Sheets-Sheet 2

INVENTOR
Walter H. Marsh.
BY
Lewis D. Koenigsford
ATTORNEY

Patented Sept. 24, 1940

2,216,016

UNITED STATES PATENT OFFICE 2,216,016

FLUID METER

Walter H. Marsh, Crafton, Pa., assignor to Pittsburgh Equitable Meter Company, Pittsburgh, Pa., a corporation of Pennsylvania Application August 5, 1937, Serial No. 157,537

9 Claims. (Cl. 73—233)

The present invention relates to fluid meters, and relates particularly to meters for the measurement of liquids having a variable property due to dissolved gases, or for measurement liquids of variable density, although not limited thereto.

Crude petroleum, as it comes from the oil wells, contains gases dissolved therein, and in the ordinary separation process the largest portion of this gas is removed, and the residual gas separates out when the petroleum is placed in storage. In the prorationing of well flows under the various State and federal laws, or in the computation for taxation, the petroleum as it comes from the separator is measured to determine its volume, and it is apparent that dissolved gases increase the volume as thus measured so that a tax based on the ordinary volume measurement would include the dissolved gas. As the tax is based upon the amount of oil, and does not take into consideration the amount of dissolved gas, it is highly desirable that the actual volume of the crude oil shall be calculated independently of the quantity of dissolved gas therein.

Accordingly, it is an object of the present invention to provide a fluid meter having therein mechanism which may be set to compute the volume of fluid passed through the meter corrected to compensate for differences in specific gravity or other variables of the fluid.

A further object is the provision of a fluid meter having means for measuring the actual volume of fluid passing through the meter, and means for correcting the measurement for a variable property of the fluid to be measured.

Still another object is the provision of a fluid meter having manually adjustable means for correction the meter reading to compensate for a variable property of the fluid being measured and in which said adjustable means may be adjusted without taking the meter out of service.

Another object is the provision of a fluid meter which is compact and which automatically calculates the fluid volume passing through the meter corrected for a variable property of the fluid.

Still another object of the invention is to provide a fluid meter which registers the volume of fluid passed therethrough and automatically computes and indicates the corrected volume in accordance with a predetermined property or properties of the fluid being measured.

According to the present invention a fluid meter drives a register which is calibrated to measure the volume flow through the meter, and a second or adjustment register is provided to be indirectly driven by the fluid meter and the driving means of which may be set or adjusted to drive the second register in accordance with the analyzed proportion of gas in the petroluem being measured. The proportion of gas in the petroleum may be determined by a sampler and the adjustment set manually or automatically in accordance with the sample analysis. The driving mechanism for the adjustment register preferably is geared to normally drive the adjustment register at a slower speed than the directly connected register, and the adjustable mechanism for the adjustment register may be set to increase the speed of the adjustment register up to the desired ratio with respect to the directly connected register. The indirect driving mechanism includes a plurality of one way clutches, friction clutches of the ball type preferably being employed, one of said clutches being driven by the other clutch through the intermediary of variable drive means provided between the clutches whereby a periodic overdrive may be imparted to the second clutch which in turn drives the second register. The over-driving clutch may drive the adjustment register directly, or step up or step down gearing may be interposed. In the preferred embodiment the over-drive impulse means comprises an arm connected to the second clutch and moved by a pivoted link guided at one end in an eccentric track having a slidable connection with said arm whereby said arm is periodically advanced and retarded in its cycle of movement, the clutch arrangement being such that the corrected register is driven by the faster moving clutch member.

The invention will be described in greater detail in the following description taken in connection with the accompanying drawings wherein I have shown a preferred modification of the invention by way of example, and wherein.

Figure 1:
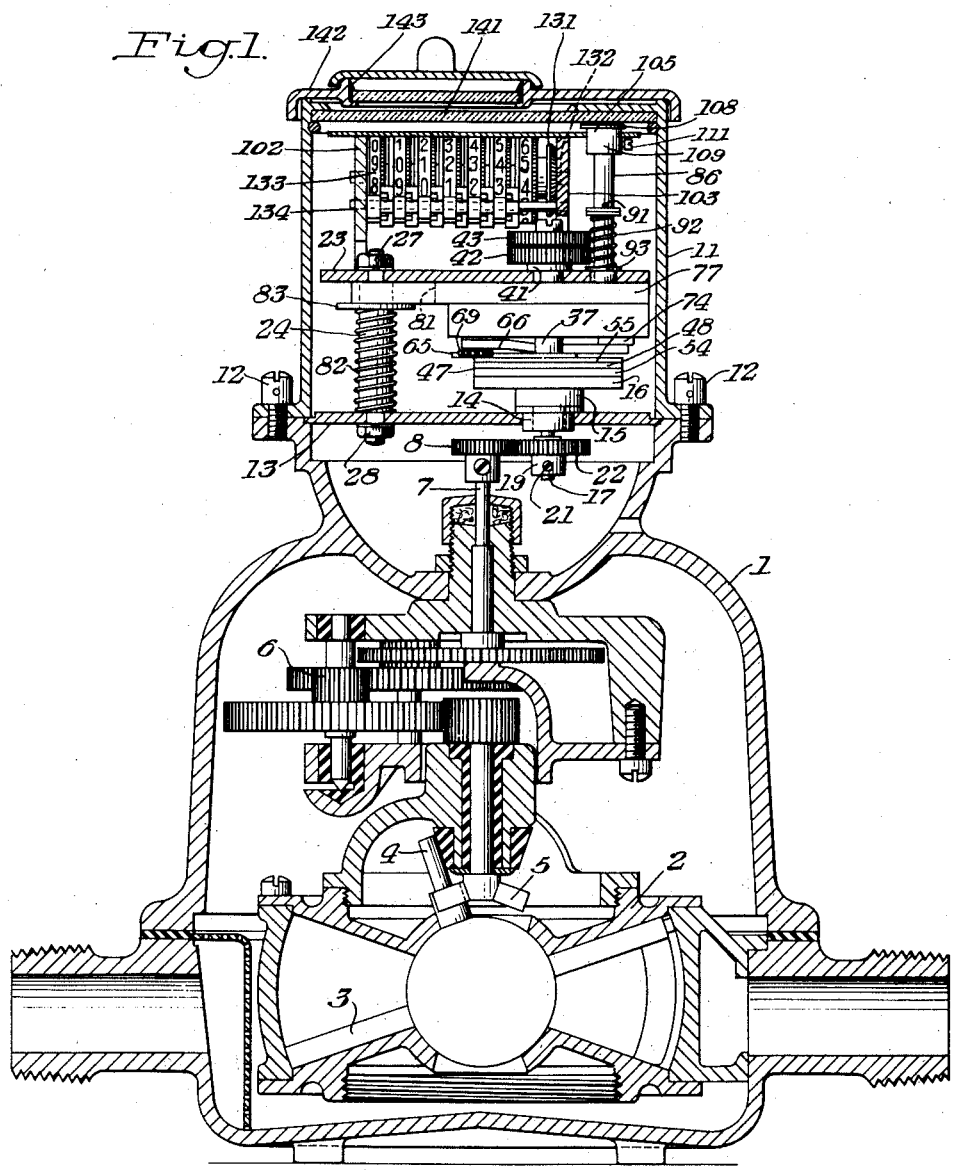
Figure 1 is a view in vertical section with the register mechanism partly in elevation, of a preferred embodiment of the invention.
Figure 2:
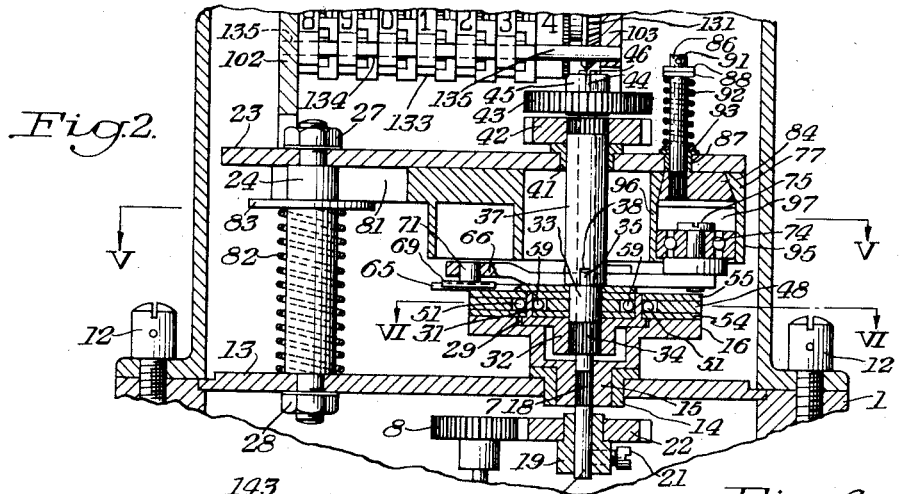
Figure 2 is an enlargement view in vertical section of the register mechanism.
Figure 3:
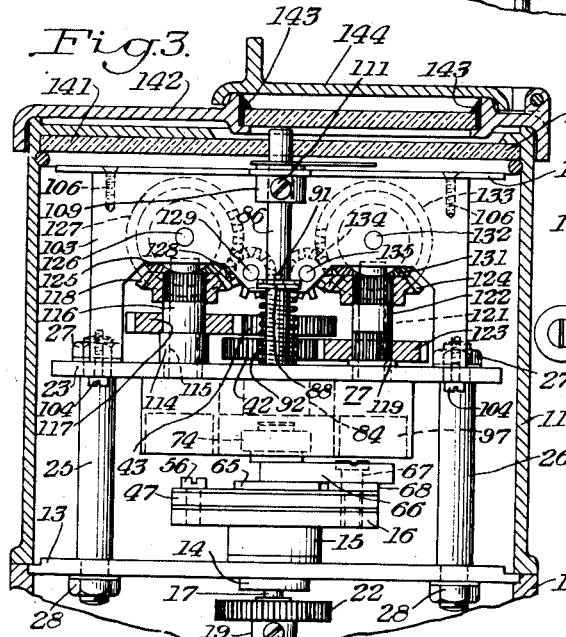
Figure 3 is a side view of Figure 2 on a slightly reduced scale, looking from the right, the casing being shown in section.
Figure 4:
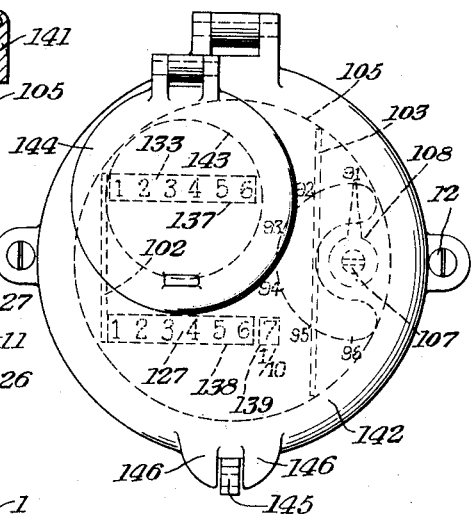
Figure 4 is a plan view of Figure 1 without the meter casing.
Figure 5:
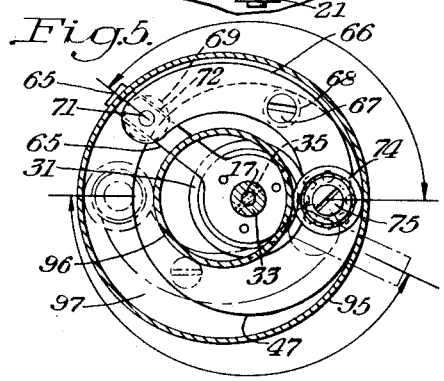
Figure 5 is a sectional view of a part of the mechanism taken on line V—V of Figure 2.

Referring to the drawings, the numeral 1 designates a meter casing having a measuring chamber 2 therein in which is located a nutating disk 3. A pin 4 in the disk 3 revolves with the disk, and the motion of the pin 4 is transmitted by a dog 5 and the intermediate gearing indicated by numeral 6 to the register driving shaft 7 having a driving gear 8 thereon. A register casing 11 is secured to the meter casing 1 by screws 12, and an intermediate plate 13 is clamped in place on an internal shoulder of the casing 1 by the register casing 11 and screws 12. A flanged bushing 14 is located in a suitable bore in the intermediate plate 13, and has journalled therein a hub 15 (Figure 2) having a flange 16 integral therewith. A shaft 17 has a fluted portion 18 by which the hub 15 is secured thereto to rotate therewith, and a collar 19 is secured to the lower end of shaft 17 by a set screw 21, the gear wheel 22 being suitably secured on collar 19 as by a pressed fit, and meshing with the driving gear 8. A second bearing plate 23 is secured in spaced relation to the bearing plate 13 by spacer posts 24, 25 and 26 which have reduced threaded ends receiving the nuts 27 and 28 by which the plates 13 and 23 are held in assembled relation. The flange 16 has a central depressed portion or recess 29 which receives a clutch drum having a cylindrical clutch wall 31 and a hub 32 integral with the head of the drum. A hollow stub shaft 33 has a fluted end 34 by which it is secured to the hub 32 of the clutch drum. Stub shaft 33 is cut away to provide two tongues 35, and a hollow extension shaft 37 having a slot 38 in its lower end receives the tongues 35 on stub shaft 33. The shaft 37 extends upwardly and is journalled at its upper end in a flanged bushing 41 pressed into a suitable bore in plate 23, a gear wheel 42 being pressed onto the fluted upper end of shaft 37. The shaft 17 passes through hollow stub shaft 33 and hollow extension shaft 37 and at its upper end carries a gear wheel 43 secured in place by a key 44 passing through the split gear collar 45 and the split end 46 of shaft 17.

Figure 6:
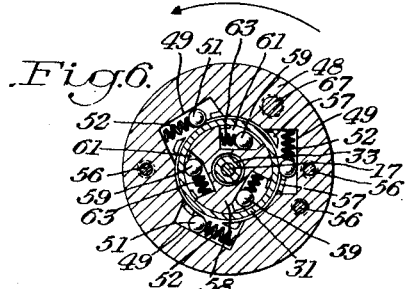
Figure 6 is a sectional view taken on line VI—VI of Figure 2.

The flange 16 carries an exterior one way grip clutch element indicated by the numeral 47 which in the preferred embodiment comprises an annular middle disk 48 (Fig. 6) having tangential recesses 49 in its inner periphery in which are located steel balls 51 urged inwardly by springs 52 in the recesses 49. The balls and springs are covered by two similar annular cover plates 54 and 55 which are secured to the middle plate 48 by screws 56, or in any other suitable manner and have turned in portions 57 which prevent the balls from falling out of the recesses. The arrangement is such that when the exterior clutch member turns counterclockwise, as seen in Fig. 6, the balls 51 will be wedged into the recesses and will grip the outer periphery of drum 31 so that the drum 31, shaft 33 and shaft 37 carrying gear 42 will rotate in unison therewith. As shaft 17 is also secured to the outer clutch member by the hub 15 the gear 43 will also rotate therewith. Within the clutch drum 31 is a similar one way clutch assembly designated generally by the numeral 58 and which is similarly constructed with balls 59 received in the tangential recesses 61 in the middle plate and urged outwardly by springs 63. The arrangement of balls and recesses in the two clutches is such that when the clutch members 47 and 58 are rotating in counterclockwise direction at the same speed the drum 31 is driven in unison therewith, and when the members 47 and 58 are rotating at unequal speeds the drum 31 is driven by the faster moving member and the balls of the slower moving member idle over the drum 31.

A compensator arm 65 is riveted or otherwise secured to the inner clutch assembly 58 and is rotatable therewith. A bent driver link 66 is pivotally secured at its middle to the outer clutch 47 by a shouldered screw 67 and spacing washer 68, and at one end it carries a shoe 69 held by a stub 71 pivoted in the arm 66, the shoe 69 having a groove 72 therein on its under surface which slidably receives the compensator arm 65. The opposite end of arm 66 carries a ball bearing roller assembly 74 secured in position by a shouldered screw 75. A cam track assembly 77 comprises a base which is slotted at 81 to receive the spacer 24, and the spring 82 abutting the lower plate 13 and the washer 83 holds the eccentric track assembly against the upper plate 23. The base of the cam track assembly 77 has a tapered bore to receive a circular tapered disk 84 with an accurate fit and an adjustment stem 86 has its fluted lower end received in a suitable bore in the disk 84. The stem 86 extends through a bushing 87 in the plate 23 and has a pair of washers 88 thereon, a pin 91 passing through the stem limiting upward movement of the washers. The reaction of a spring 92 abutting the washers 88 at the top and washer 93 at the bottom holds the right end of cam track assembly 77 against the plate 23, and holds the disk 84 tightly in the bore in the cam track base to prevent any lost motion.

Cam track assembly 77 has two concentric flanges 95 and 96 integral therewith which provide a track 97 therebetween and the ball bearing roller 74 is confined in this track 97. By rotating stem 86 the eccentric disk 84 is rotated and moves the cam track assembly 77 to the left or right as desired. Two end plates 102 and 103 are secured to the top plate 23 by screws 104 and at their tops carry the register plate 105 secured thereto by screws 106. The adjustment stem 86 extends through the register plate 103 and has a kerf 107 in its upper end whereby it can be rotated by a screw driver. A pointer 108 is secured to a sleeve 109 held on stem 86 by a set screw 111 and cooperates with a calibrated scale marked off in percentage whereby an exact adjustment can be made.

A bushing 114 is located in an aperture in bearing plate 23 and has a stub shaft 115 driven therein on which is journalled a sleeve 116 having a spur gear 117 meshing with gear 43 and a bevel gear 118 driven thereon. A similar bushing 119 on the other side has a stub shaft 121 driven therein on which is journalled the sleeve 122 carrying the intermediate step down spur gear 123 at its lower end meshing with gear 42 and carries the bevel gear 124 at its upper end. The bevel gear 118 meshes with a bevel gear 125 secured on shaft 126 journalled in the end plates 102 and 103. Shaft 126 carries a numeral wheel assembly or register 127 which operates in conjunction with transfer pinions 128 on shaft 129 also journalled in end plates 102 and 103 whereby the register numeral wheels are successively advanced step by step. A similar bevel gear 131 is secured to shaft 132 which is journalled in end plates 102 and 103 and carries the numeral wheels 133. Transfer pinions 134 on shaft 135 cooperate with the numeral wheel assembly to successively advance the counter wheels step by step. The numerals are visible through sight openings 137, 138 and 139 by which the numerals may be read through the glass cover 141 of the register case 11. The separate sight opening 139 is provided to obviate the possibility of reading the numeral therein as a unit instead of a fraction.

The register case carries a cover 142 hinged to the casing 11 which covers the whole face and has a circular opening 143 therein opening directly over register 133, and cover 144 is hinged to cover 142 and covers the opening 143. Cover 142 can be locked in closed position by a padlock (not shown) passing through eye 145 on the casing 11 and over the fingers 146 on the cover 142. This arrangement allows register 133 to be read upon lifting cover 144, and register 127 can be read only by authorized persons having a key for the padlock.

The operation of the apparatus now will be described. The flow of fluid through the meter chamber 2 causes the disk 3 to nutate and the motion of the pin 4 which causes rotation of dog 5 is transmitted by the gear train 6 to the register drive shaft 7. The shaft 7 through meshing gears 8 and 22 drives shaft 17 which carries the spur gear 43 at its upper end, and the spur gear 43 meshes with spur gear 117 which drives intermeshing miter gears 118 and 125 whereby the counter 127 is driven to register the volume of fluid passed through the meter.

The flange 16 secured by its hub 15 to shaft 17 rotates the outer one way clutch member 47 in counter clockwise direction as indicated by the arrow in Figure 6. The link 66 pivotally secured on member 47 is thus rotated to cause roller 74 to move in the circular track 97. When the center of track 97 is eccentric with respect to the shaft 17 the center of roller 74 will be shifted to and from shaft 17, thus pivoting the other end of the link 66 carrying shoe 69 to and from shaft 17. As link 66 is pivoted at 67 it will be seen that the arm 65 slides in shoe 69 to allow such movement, and this advances or retards arm 65 depending on the position of the roller 74 in its orbit. When arm 65 is advanced it imparts an accelerated movement to inner clutch member 58 and therefore the inner clutch member drives the drum 31. When arm 65 is being retarded the inner clutch balls 59 idle over the drum 31 so that the drum is driven by the outer clutch member. Thus, by regulating the eccentricity of track 97 the clutch drum 31 may be driven at a greater speed than the outer clutch member.

The hollow stub shaft 33 connected to the drum 31 drives the hollow shaft 37 coupled thereto which rotates gear 42. Gear 42 meshes with step down gear 123 which by means of meshing mitregears 124 and 131 drives the register 133. When track 77 is concentric with shaft 17 the step down gearing 42 and 123 drives register 133 about ninety per cent of the speed of register 127, and when track 77 is eccentric the register 133 is driven at any desired speed up to ninety-six per cent of register 127. It will be understood that the range of adjustment and the gearing may be varied to drive the adjustment register at any desired ratio with respect to the directly driven register, the specific range of 90% to 96% being given merely by way of example. When it becomes necessary to change the adjustment the stem 86 is rotated to bring pointer 108 opposite the desired percentage correction factor. This turns eccentric 84 and shifts the track assembly 77 to the desired eccentricity with respect to shaft 17, the slot 81 and spring 82 allowing such motion, so that the register 133 is driven at a rate indicated by the index.

The invention may be embodied in other specific forms without departure from the spirit or essential characteristics of the present invention. The specific form described herein therefore is to be considered in all respects as illustrative and not restrictive of the invention.

What is claimed and desired to be secured by United States Letters Patent is:

1. In combination with a fluid meter having a metering chamber with a metering element in said chamber and a register having a driving connection with said metering element to indicate the volume flow of fluid through the measuring chamber, the improvement wherein the driving connection between said register and said measuring element includes a plurality of one way clutches, means connecting said clutches to rotate one of said clutches from the other, and means to adjust the connecting means between said clutches to vary the driving connection with the register.

2. In combination with a fluid meter having a measuring chamber with a measuring element in said chamber and a register connected to be driven by said metering element by a variable drive mechanism between said metering element and said register, the improvement wherein said variable drive mechanism comprises a common driven clutch element, a plurality of concentric one way clutch members operating on said common driven clutch element, and a driving connection between said clutch members comprising an adjustable track, and a link pivoted to one clutch member having one end guided in said adjustable track and its other end slidably connected to the other clutch member.

3. In a fluid meter, a metering chamber, a metering element in said chamber, a register driven by said metering element to indicate the volume flow of fluid through the measuring chamber, a second register, a driving connection between said second register and said measuring element including a plurality of frictional one way clutches, sequential drive means between said clutches, and means in the sequential drive means between said clutches to adjust the motion of one of said clutches to vary its driving ratio to the second register.

4. In a fluid meter, a measuring chamber, a metering element in said chamber, a register driven by said metering element to indicate the volume flow of fluid through said meter, a second register, a plurality of one way drive elements between said second register and said measurement element, sequential drive means between said elements, an eccentric, and means guided by said eccentric to periodically vary the sequential drive means between said one way drive elements to adjust the motion of one of said one way drive elements to vary its driving ratio to the second register.

5. In a fluid meter, an outer casing, a measuring chamber in said casing, a metering element in said chamber, a register casing secured to said outer casing, a register in said register casing connected to be driven by said metering element, a second register in said register casing, a variable drive mechanism between said metering element and said second register, including a common driven element for driving said second register and a plurality of one way clutch members acting on said common driven element, a link pivoted to one of said clutch members and slidably connected to the other of said clutch members, a track for guiding said link, and means to adjust the eccentricity of said track.

6. In a fluid meter, an outer casing, a measuring chamber in said casing, a metering element in said chamber, a register casing secured to said outer casing, a register in said register casing connected to be driven by said metering element, a second register in said register casing, a variable drive mechanism between said metering element and said second register including a common driven element for driving said second register and a plurality of one way clutch members acting on said common driven element, means connecting said clutch members to drive one of said members from the other said connecting means including a link pivoted to one of said clutch members intermediate its ends and having a sliding pivotal connection to the other of said clutch members adjacent one end, a track for guiding the opposite end of said link, and means to adjust the eccentricity of said track.

7. In a fluid meter for measuring a fluid and compensating for a predetermined property of the fluid to be measured comprising a measuring chamber with a metering element in said chamber and plural registers driven by said metering element, the improvement wherein one of said registers is connected to said metering element by a variable connection comprising a common driven element, a plurality of one way drive elements acting on said common driven element, and a link pivoted to one of said drive elements and having a slidable pivotal connection to the other of said drive elements, and an adjustable track for guiding said link.

8. In a fluid meter, a measuring chamber, a metering element in said chamber, a register connected to said metering element to be driven thereby, a second register, a common driven element for driving said second register, a plurality of one-way drive elements between said measuring element and second register acting on said common driven element, means connecting said one-way drive elements to rotate one of said elements from the other in sequence, and means to adjust the connecting means to vary the driving relation therebetween.

9. In a fluid meter, a measuring chamber, a metering element in said chamber actuated by flow of fluid therethrough to be measured, a register connected to said metering element to indicate the flow of fluid therethrough, a second register, means for driving said second register comprising a plurality of one-way drive elements between said second register and said measuring element, sequential drive means connecting said one-way drive elements to rotate one of said elements from the other in sequence, and means to adjust said sequential drive means to compensate for a predetermined property of the fluid to be measured.

WALTER H. MARSH.